April 3, 1934.  J. C. PURDIE  1,953,501
VALVE CONSTRUCTION
Filed May 12, 1932
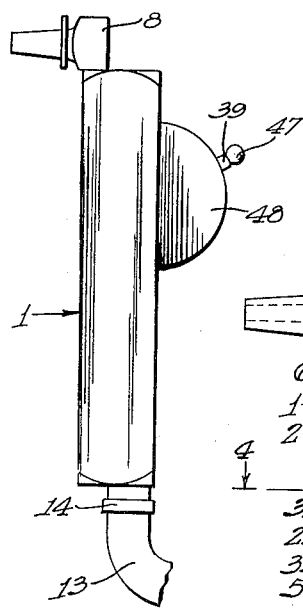
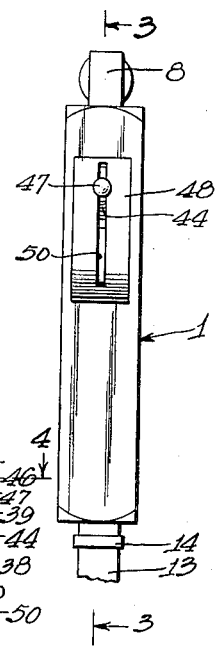
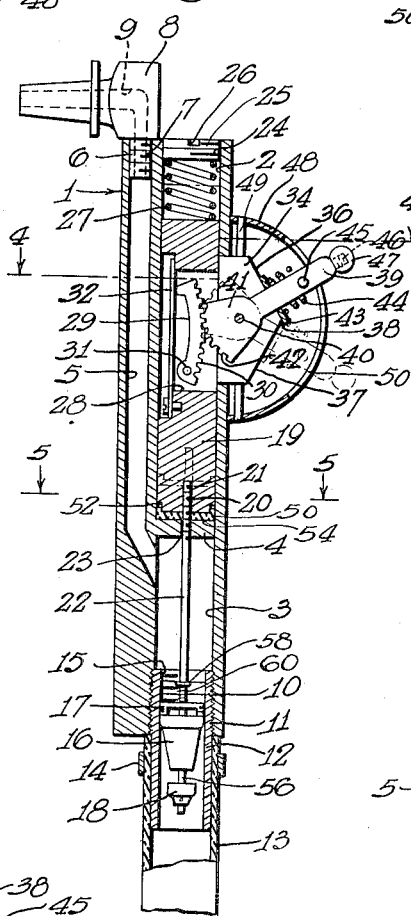
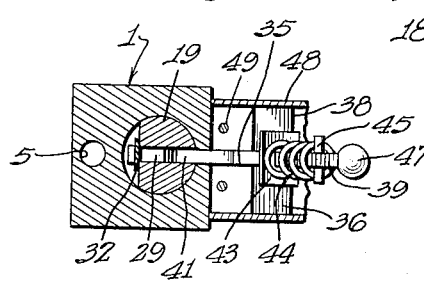
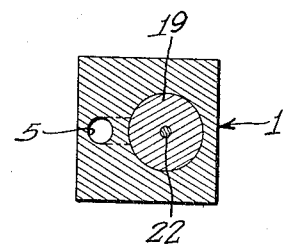
Inventor:
John C. Purdie
By: Munn & Co.
Attys Patented Apr. 3, 1934

1,953,501

UNITED STATES PATENT OFFICE 1,953,501

VALVE CONSTRUCTION

John C. Purdie, Chicago, Ill.

Application May 12, 1932, Serial No. 610,930

7 Claims. (Cl. 251—42)

My invention relates to improvements in valve constructions, and it consists in the combinations, constructions, and arrangements herein described and claimed.

An object of my invention is to provide a novel valve construction, particularly adapted for use in connection with a pipe line containing a fluid, such as gas under pressure, and manually operable in a quick and easy manner for controlling the flow of the fluid through the valve as may be desired.

Another object is to provide a novel valve construction for use in connection with a pipe line containing a fluid or gas under pressure, and which is particularly adapted to the needs of a physician or dentist, and conveniently operable by him for controlling the flow of the gas through the valve when treating internal or external surfaces of a patient's body.

A further object is to provide a valve mechanism of the type hereinafter set forth in the specification which is simple in construction, positive in operation, and easily operated.

Other objects and advantages will appear in the following specification, and the novel features of the invention will be particularly pointed out in the appended claims.

My invention is illustrated in the accompanying drawing, forming part of this application, in which Figure 1 is a side elevational view showing the device connected with a flexible pipe line, Figure 2 is an elevational view showing the device as viewed from the right in Figure 1, Figure 3 is a vertical sectional view taken substantially along the line 3—3 of Figure 2, Figure 4 is a horizontal sectional view taken substantially along the line 4—4 of Figure 3, and Figure 5 is a horizontal sectional view taken substantially along the line 5—5 of Figure 3.

In carrying out my invention, I provide a body portion 1 having cylindrical chambers 2 and 3 therein which are separated by a partitioning portion 4 of the body portion 1. The body portion 1 is further provided with a passageway 5 which is in communication with the cylindrical chamber 3. The body portion is provided with a threaded portion 6 which comprises part of the passageway 5 and is adapted for receiving a threaded nipple 7 connected with a nozzle 8 which has a passageway 9 therein for providing communication between the passageway 5 and the exterior of the nozzle. The body portion 1 is also provided with a threaded portion 10 which comprises a part of the cylindrical chamber 3 and is adapted for receiving a threaded portion 11 of a sleeve 12 for connecting the sleeve with the body portion.

A pipe line or flexible hose 13 has one end connected with the sleeve, as shown in Figure 3, by any suitable means such as a band 14. The other end of the pipe 13 is in communication with any suitable means for supplying fluid under pressure to the pipe line. The sleeve 12 is provided with a threaded internal portion 15 for receiving and retaining a valve seat member 16 having threads 17 in engagement with the threads 15 so that the valve seat member 16 may be adjustably positioned with respect to the sleeve 12.

A valve cap member 18 is associated with the valve seat and is normally positioned in engagement therewith for closing an opening through the valve seat 16. A valve stem 56 is connected with the cap member 18 and extends through the valve seat member 16. The valve stem 56 is provided with a head portion 58. A spring 60 is disposed on the valve stem 56 and is positioned between the head portion 58 and the valve seat member 16 for normally retaining the cap member 18 in engagement with the valve seat member 16, which is its normal position. In Figure 3, however, the valve cap member 18 is shown in its open position for illustrating the operation, as will be hereinafter set forth.

The valve structure per se above described does not constitute a part of my invention and may be the conventional type of tire valve whose structure is familiar to those skilled in the art.

A piston member 19 is slidably disposed in the cylindrical chamber 2 and is provided with a threaded opening 20 therein for receiving the threaded end portion 21 of a rod 22 which extends through an opening 23 in the partitioning portion 4, and abuts the head portion 58 of the valve stem 56 so that the valve cap member 18 may be moved when the piston member 19 is moved.

The body portion 1 is provided with a threaded portion 24 which comprises part of a cylindrical chamber 2 and is adapted for receiving a threaded plug 25 having a slotted recess 26 therein. A compression spring 27 is positioned between the plug 25 and the piston member 19. The plug member 25 may be adjustably positioned within the cylindrical chamber 2 for changing the pressure which the spring 27 exerts on the piston member 19. The piston member 19 is provided with a cut-out portion 28 for receiving a rack 29 having teeth 30.

The rack 29 may be connected with the piston member 19 in any suitable manner, such as by having one end pivotally connected with the piston member 19 by a pin or screw 31. A spring member 32 may have one end fixedly connected with the piston member 19 by any suitable means, such as a screw 33. The unattached end of the rack 29 may engage the unattached end of the spring 32 so that the rack 29 may be yieldingly retained in place by the spring 32.

The body portion 1 is provided with a pair of spaced-apart lug portions 34 which may be integral therewith and have a space 35 therebetween. Each of the lugs 34 is provided with a pair of oppositely inclined faces 36 and 37 which join at an apex 38.

An actuating arm 39 extends between the lug portions 34 and is pivotally connected therewith by any suitable means, such as a pivot pin 40. The actuating arm 39 is provided with a segmental portion 41 having teeth 42 in meshing engagement with the teeth 30 of the rack 29, so that the piston member 19 may be moved within the cylinder chamber 2 when the actuating arm 39 is moved.

A bearing plate 43 is slidably disposed on the actuating arm 39 and is held in engagement with the faces 36 and 37, depending on the position of the actuating arm 39, by reason of a compression spring 44 disposed on the arm 39 and retained in pressing engagement with the bearing plate 43 by reason of a retaining member, such as a pin 45, connected with the actuating arm. The actuating arm may be provided with a threaded end portion 46 for having a knob 47 connected therewith.

A cover member 48 is connected with the body portion by any suitable means, such as pins or screws 49, in engagement with the lug portions 34, and is provided with a slotted opening 50 therein for receiving the actuating arm 39. The actuating arm 39 extends through the slotted opening 50 so that the knob 47 will be positioned on the exterior of the cover member 48.

From the foregoing description of the various parts of the device, the operation thereof may be readily understood. When the actuating arm 39 is in its dotted line position shown in Figure 3, the cap member 18 will be disposed on the valve seat member 16 so that no fluid can pass from the pipe 13 through the valve and into the cylindrical chamber 3. When the device is in use, the body portion may be held in the hand of the operator, and the actuating arm moved by the thumb of the operator's hand being in engagement with the knob portion 47.

When it is desired to open the valve for permitting fluid to be forced through the passageway 5 of the body portion and the passageway 9 of the nozzle 8, the actuating arm 39 is moved from its dotted line position in Figure 3 to the solid line position. This movement of the actuating arm to the position shown in Figure 3 will cause the piston member 19 to be moved downwardly, which in turn moves the rod 22 downwardly for moving the valve cap member 18 away from the valve seat member 16, and thereby opening the valve for permitting the fluid in the pipe 13 to flow through the valve into the chamber 3, through the passageway 5, through and from the passageway 9 of the nozzle.

The bearing plate 43 tends to retain the actuating arm in position by reason of the action of the spring 44. When it is desired to again close the valve, the actuating arm 39 is again moved to the dotted line position, thereby moving the piston member 19 and the rod 22 upwardly, which will result in the positioning of the cap member 18 on the valve seat member, and thereby closing the opening through the valve seat member.

When the actuating arm is moved, the spring 44 associated therewith permits the bearing plate 43 to be moved with respect to the actuating arm for passing over the apex 38. It will be noted that the movability of the rack 29 and the spring 32 compensates for differences in the curvatures of the rack and segment and also compensates for imperfections of construction of the teeth of both the segment 41 and the rack 29 and yieldingly retains the teeth of the rack and segment in mutual engagement.

The spring 27 positioned between the plug 25 and the head of the piston member 19 is for the purpose of compensating for the pressure of the fluid in the pipe 13 on the valve cap member 18 so that the pressure of the fluid cannot affect the operation of the valve, the valve being wholly controllable through the actuating arm 39.

A sealing washer 50 is positioned within the chamber 2 and on the partitioning portion 4 of the body portion. The piston member 19 is provided with an annular recess 52 for providing the piston member with a reduced end portion 54 adapted for engaging the washer 50 when the piston is depressed and the valve mechanism open, thereby preventing the fluid passing through the chamber 3 from leaking by the piston 19.

While I have shown and described my invention as having a certain construction, it will be readily understood that various modifications and changes may be made therein without departing from the spirit or scope of my invention.

I claim:

1. A device of the type described comprising a body portion adapted for being connected with a fluid supply pipe and having a passageway therein positioned for communication with the fluid supply pipe, valve means associated with the body portion for controlling the flow of fluid through the passageway, a piston member slidably disposed in the body portion and operatively connected with the valve means for actuating said valve means when the piston member is moved, said piston member being provided with a toothed portion, an actuating arm pivotally carried by the body portion and provided with a toothed portion in meshing engagement with the toothed portion of said piston member, whereby said piston member may be moved when said arm is actuated for operating said valve means, and means associated with the actuating arm for retaining the valve means in given positions.

2. A device of the character described comprising a housing adapted for being connected with a fluid supply means and provided with a passageway therein, valve means for cutting off communication between said passageway and fluid supply means, a piston member slidably disposed in the housing and operatively connected with the valve means for opening or closing said valve means when the piston member is moved, an actuating arm pivotally carried by the housing and operatively connected with the piston member for moving the same, a projecting portion connected with the housing and positioned at a side of the actuating arm, said projecting portion being provided with inclined faces, and means movably connected with the actuating arm and adapted for engagement with the inclined faces of the projecting portion for retaining the actuating arm in given positions whereby the valve means may be retained in open or closed positions.

3. A device of the character described comprising a housing adapted for being connected with a fluid supply means and provided with a passageway therein, valve means for cutting off communication between said passageway and fluid supply means, a piston member slidably disposed in the housing and operatively connected with the valve means for opening or closing said valve means when the piston member is moved, an actuating arm pivotally carried by the housing and operatively connected with the piston member for moving the same, a pair of projecting portions connected with the housing and positioned on opposite sides of the actuating arm, each of said projecting portions being provided with oppositely inclined faces, and means movably connected with the actuating arm and adapted for yieldingly engaging the inclined faces of the projecting portions for retaining the actuating arm in given positions whereby the valve means may be retained in open or closed positions.

4. A device of the character described comprising a housing adapted for being connected with a fluid supply means and provided with a passageway therein, valve means for cutting off communication between said passageway and fluid supply means, a piston member slidably disposed in the housing and operatively connected with the valve means for opening or closing said valve means when the piston member is moved, a toothed rack movably connected with the piston member, an actuating arm pivotally carried by the housing and provided with a toothed segment in meshing engagement with the toothed rack, means for retaining the toothed rack in yielding engagement with the toothed segment whereby the piston member may be moved for opening or closing the valve means when the actuating arm is moved.

5. A device of the character described comprising a housing adapted for being connected with a fluid supply means and provided with a passageway therein, valve means for cutting off communication between said passageway and fluid supply means, a piston member slidably disposed in the housing and operatively connected with the valve means for opening or closing said valve means when the piston member is moved, said piston member being provided with an opening in a side thereof and having a toothed portion within the opening, an actuating arm pivotally carried by the housing and extending within the opening, said arm being provided with a toothed end portion in mesh with the piston toothed portion whereby the piston member may be moved for opening or closing the valve means when the actuating arm is moved, and means for retaining the actuating arm in given positions for retaining the valve means in open or closed positions.

6. A device of the character described comprising a housing adapted for being connected with a fluid supply means and provided with a passageway therein, valve means for cutting off communication between said passageway and fluid supply means, a piston member slidably disposed in the housing and operatively connected with the valve means for opening or closing said valve means when the piston member is moved, said piston member being provided with an opening in a side thereof and having a toothed portion within the opening, an actuating arm pivotally carried by the housing and extending within the opening, said arm being provided with a toothed end portion in mesh with the piston toothed portion whereby the piston member may be moved for opening or closing the valve means when the actuating arm is moved, a projecting portion connected with the housing and positioned at a side of the actuating arm, said projecting portion being provided with inclined faces, and means movably connected with the actuating arm and adapted for engagement with the inclined faces of the projecting portion for retaining the actuating arm in given positions whereby the valve means may be retained in open or closed positions.

7. A device of the character described comprising a housing adapted for being connected with a fluid supply means and provided with a passageway therein, valve means for cutting off communication between said passageway and fluid supply means, a piston member slidably disposed in the housing and operatively connected with the valve means for opening or closing said valve means when the piston member is moved, said piston member being provided with an opening in a side thereof and having a toothed portion within the opening, an actuating arm pivotally carried by the housing and extending within the opening, said arm being provided with a toothed end portion in mesh with the piston toothed portion whereby the piston member may be moved for opening or closing the valve means when the actuating arm is moved, a pair of projecting portions connected with the housing and positioned on opposite sides of the actuating arm, each of said projecting portions being provided with oppositely inclined faces, and means movably connected with the actuating arm and adapted for yieldingly engaging the inclined faces of the projecting portions for retaining the actuating arm in given positions whereby the valve means may be retained in open or closed positions.

JOHN C. PURDIE.